(12) United States Patent
Rempel et al.

(10) Patent No.: US 10,398,076 B1
(45) Date of Patent: Sep. 3, 2019

(54) METHOD AND SYSTEM FOR PREVENTING PLUGGING OF AN AGRICULTURAL PARTICULATE MATERIAL

(71) Applicant: CNH Industrial Canada, Ltd., Saskatoon (CA)

(72) Inventors: Trevor Rempel, Saskatchewan (CA); Gordon A. Engel, Saskatchewan (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/933,682

(22) Filed: Mar. 23, 2018

(51) Int. Cl.
| | |
|---|---|
| A01C 7/10 | (2006.01) |
| A01C 23/00 | (2006.01) |
| A01C 7/12 | (2006.01) |
| A01C 7/08 | (2006.01) |
| G05B 23/02 | (2006.01) |

(52) U.S. Cl.
CPC .............. *A01C 7/102* (2013.01); *A01C 7/082* (2013.01); *A01C 7/107* (2013.01); *A01C 7/128* (2013.01); *A01C 23/007* (2013.01); *G05B 23/0286* (2013.01)

(58) Field of Classification Search
CPC ......... A01C 7/102; A01C 7/082; A01C 7/107; A01C 7/128; A01C 7/007; G05B 23/0286
USPC ....................................................... 340/608
See application file for complete search history.

(56) References Cited

U.S. PATENT DOCUMENTS

| | | | | |
|---|---|---|---|---|
| 2,950,260 A | | 8/1960 | Rosenbaum et al. | |
| 4,647,919 A | * | 3/1987 | Wright | F16N 29/04 340/606 |
| 4,734,681 A | * | 3/1988 | Suzuki | B05B 12/08 340/608 |
| 4,922,233 A | * | 5/1990 | Twerdochlib | F16T 1/48 340/606 |
| 4,947,153 A | * | 8/1990 | Berger | G01F 1/28 137/551 |
| 4,961,068 A | * | 10/1990 | Hendricksen | E03F 7/00 340/608 |

(Continued)

OTHER PUBLICATIONS

Oil & Gas Journal Xiaofang Lv; Jing Gon; Wenqing Li; Yixuan Tang "Focused-beam reflectance method aids hydrate blockage prediction" http://www.ogj.com/articles/print/volume-111/issue-1/transportation/focused-beam-reflectance-method-aids.html Dated Jan. 7, 2013. (10 pages).

(Continued)

*Primary Examiner* — Ojiako K Nwugo
(74) *Attorney, Agent, or Firm* — Rebecca L. Henkel; Rickard K. DeMille

(57) ABSTRACT

In one aspect, a system for distributing an agricultural particulate material as part of a crop production process is disclosed. The system may include a distribution line configured to receive an air entrained flow of particles. A controller may be configured to monitor a flow parameter associated with the air entrained flow of particles through the distribution line based on signals received from a flow sensor. The controller may be configured to determine that a change in the monitored flow parameter over time is associated with a plugging flow pattern that is indicative of potential plugging of the distribution line and automatically initiate a corrective action associated with reducing a likelihood of the distribution line plugging.

20 Claims, 8 Drawing Sheets

(56) References Cited

U.S. PATENT DOCUMENTS

| | | | | |
|---|---|---|---|---|
| 4,995,244 | A * | 2/1991 | Steers | F25D 21/14 |
| | | | | 340/608 |
| 5,402,111 | A * | 3/1995 | Hubbard, Jr. | G01F 1/68 |
| | | | | 340/606 |
| 5,485,962 | A | 1/1996 | Moss | |
| 5,563,585 | A * | 10/1996 | MacDonald | B01D 35/02 |
| | | | | 210/435 |
| 5,673,026 | A * | 9/1997 | Marrelli | G01F 1/66 |
| | | | | 324/637 |
| 5,680,109 | A * | 10/1997 | Lowe | G01L 27/007 |
| | | | | 137/557 |
| 5,699,049 | A * | 12/1997 | Difiore | E03F 7/00 |
| | | | | 137/558 |
| 5,831,542 | A | 11/1998 | Thomas et al. | |
| 5,923,262 | A | 7/1999 | Fuss et al. | |
| 6,158,363 | A | 12/2000 | Memory et al. | |
| 6,292,103 | B1 * | 9/2001 | Cho | H01L 21/67253 |
| | | | | 118/712 |
| 6,296,425 | B1 | 10/2001 | Memory et al. | |
| 6,437,694 | B1 * | 8/2002 | Lee | G08B 13/20 |
| | | | | 340/544 |
| 6,661,514 | B1 * | 12/2003 | Tevs | A01C 7/105 |
| | | | | 250/222.2 |
| 6,894,620 | B2 * | 5/2005 | Reinhardt | B01D 46/0086 |
| | | | | 340/606 |
| 7,084,778 | B2 * | 8/2006 | Shoub | G01F 1/6847 |
| | | | | 340/606 |
| 7,091,868 | B2 * | 8/2006 | Ku | G01F 23/00 |
| | | | | 340/603 |
| 8,144,022 | B2 * | 3/2012 | Olpak | G01M 3/2807 |
| | | | | 340/606 |
| 8,857,353 | B2 | 10/2014 | Kowalchuk | |
| 8,928,486 | B2 | 1/2015 | Hui et al. | |
| 2003/0201898 | A1 * | 10/2003 | Stuchlik, III | F24F 11/30 |
| | | | | 340/608 |
| 2006/0278726 | A1 * | 12/2006 | Holly | A01C 7/044 |
| | | | | 239/67 |
| 2007/0063856 | A1 * | 3/2007 | Gibson | F22B 37/50 |
| | | | | 340/608 |
| 2008/0103629 | A1 * | 5/2008 | Milanovic | G05B 9/02 |
| | | | | 700/282 |
| 2010/0313801 | A1 | 12/2010 | Peterson et al. | |
| 2012/0036914 | A1 * | 2/2012 | Landphair | A01C 7/081 |
| | | | | 73/1.16 |
| 2013/0061790 | A1 | 3/2013 | Binsirawanich et al. | |
| 2014/0049395 | A1 * | 2/2014 | Hui | A01C 7/081 |
| | | | | 340/608 |
| 2014/0116524 | A1 * | 5/2014 | Asano | H01M 8/04955 |
| | | | | 137/12 |
| 2015/0366127 | A1 | 12/2015 | Roberge et al. | |
| 2016/0120097 | A1 * | 5/2016 | Chahley | G05D 7/0617 |
| | | | | 701/50 |

OTHER PUBLICATIONS

Energy & Fuels Zhiyuan Wang*, Yang Zhao, Baojiang Sun*, Litao, Chen, Jianbo Zhang, and Xuerui Wang "Modeling of Hydrate Blockage in Gas-Dominated Systems" http://pubs.acs.org/doi/abs/10.1021/acs.energyfuels.6b00521 Dated May 9, 2016. (2 pages).

NPL—Agtron Agtron Enterproses, Inc. "The Legend Wi-Fi Air Drill Rate & Blockage Monitor" http://www.agtron.com Dated: Oct. 5, 2017. (Two pages).

Dickey-John Dickey John "Vigilense Blockage Seed Sensor" http://www.dickey-john.com Dated: 2016 (One page).

* cited by examiner

US 10,398,076 B1

METHOD AND SYSTEM FOR PREVENTING PLUGGING OF AN AGRICULTURAL PARTICULATE MATERIAL

FIELD OF THE INVENTION

The present subject matter relates generally to agricultural equipment, and, more particularly to an agricultural product delivery system and associated method for distributing an agricultural particulate material as part of a crop production process while preventing plugging or slugging of the particulate material.

BACKGROUND OF THE INVENTION

Pneumatic agricultural product delivery systems utilize a flow of air to assist in the delivery and movement of particulate material or product, such as fertilizer, seed, insecticide or herbicide, from a product supply chamber to a growing medium, such as soil. Such pneumatic agricultural particulate material delivery systems are commonly employed in planters, air drills and a variety of other agricultural implements. Special purpose implements, such as fertilizer application equipment, planters or air seeders, may also employ pneumatic delivery systems. Known pneumatic agricultural product delivery systems typically use air in motion to transport the product through an interior passage provided by a series of elongate tubes which extend from the product supply chamber or hopper to an outlet adjacent to the soil. Various conditions may lead to product blockage in the tubes resulting in lost time and effort to remove the blockage and resume the agricultural process.

Accordingly, a system and associated method for distributing an agricultural particulate material as part of a crop production process while preventing plugging or slugging of the particulate material would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for distributing an agricultural particulate material as part of a crop production process. The system may include a distribution line configured to receive an air entrained flow of particles. The system may also include a flow sensor configured to measure a flow parameter associated with the air entrained flow of particles through the distribution line. The system may also include a controller communicatively coupled with the flow sensor. The controller may include a processor and associated memory, and the memory may store instructions that, when executed by the processor, configure the controller to monitor a flow parameter associated with the air entrained flow of particles through the distribution line to establish a baseline operating level for the flow parameter. The controller may also be configured to determine that a change in the monitored flow parameter over time is associated with a plugging flow pattern that is indicative of potential plugging of the distribution line. The plugging flow pattern may be represented by a reduction in the flow parameter below a first predetermined flow value defined relative to the baseline operating level across a first predetermined time interval followed by an increase in the flow parameter to within a predetermined threshold range defined relative to the baseline operating level. The controller may also be configured to automatically initiate a corrective action associated with reducing a likelihood of the distribution line plugging when it is determined that the monitored flow parameter has experienced the plugging flow pattern.

In another aspect, the present subject matter is directed to a method for distributing an agricultural particulate material as part of a crop production process using a distribution line configured to receive an air entrained flow of particles. The method may include monitoring, with one or more computing devices, a flow parameter associated with the air entrained flow of particles through the distribution line to establish a baseline operating level for the flow parameter. The method may also include determining, with the one or more computing devices, that a change in the monitored flow parameter over time is associated with a plugging flow pattern that is indicative of potential plugging of the distribution line. The plugging flow pattern may be represented by a reduction in the flow parameter below a first predetermined flow value defined relative to the baseline operating level across a first predetermined time interval followed by an increase in the flow parameter to within a predetermined threshold range defined relative to the baseline operating level. The method may also include automatically initiating, with the one or more computing devices, a corrective action associated with reducing a likelihood of the distribution line plugging when it is determined that the monitored flow parameter has experienced the plugging flow pattern.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
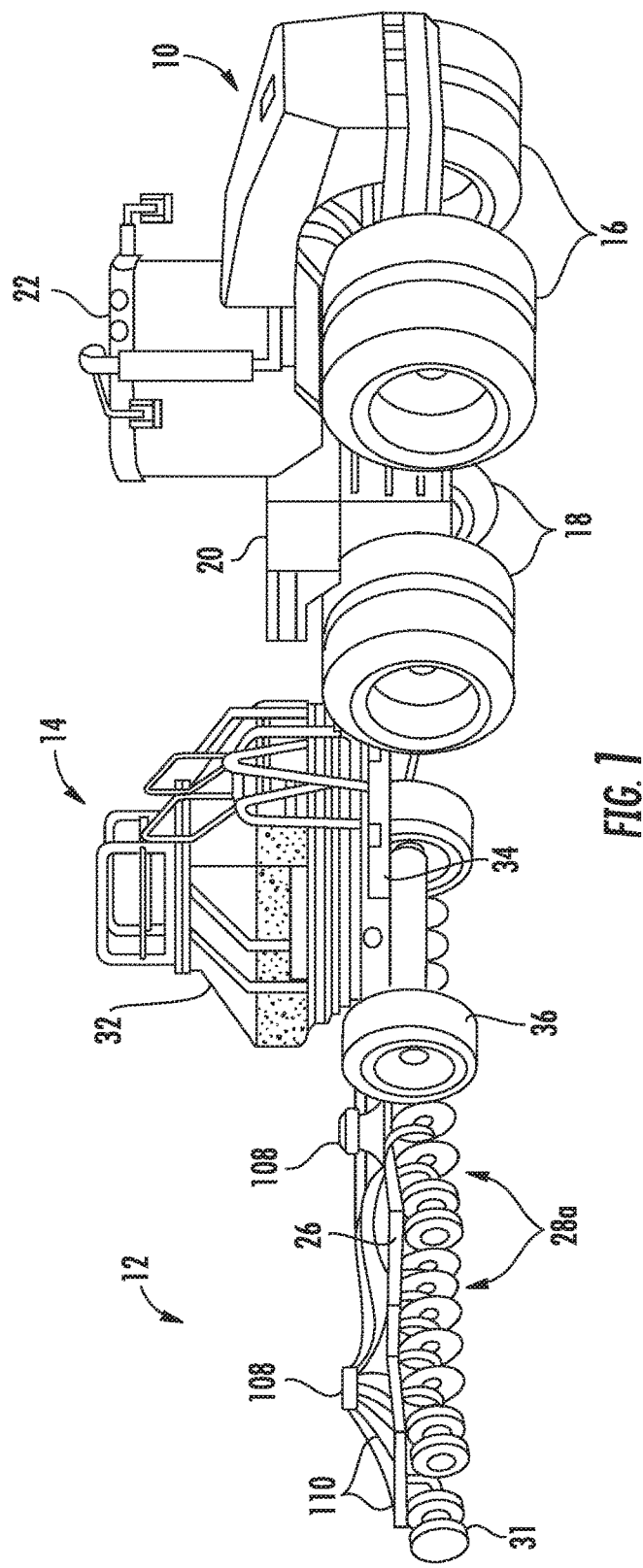
FIG. 1 illustrates a perspective view of one embodiment of a work vehicle, implement, and transport unit in accordance with aspects of the present subject matter.
Figure 2:
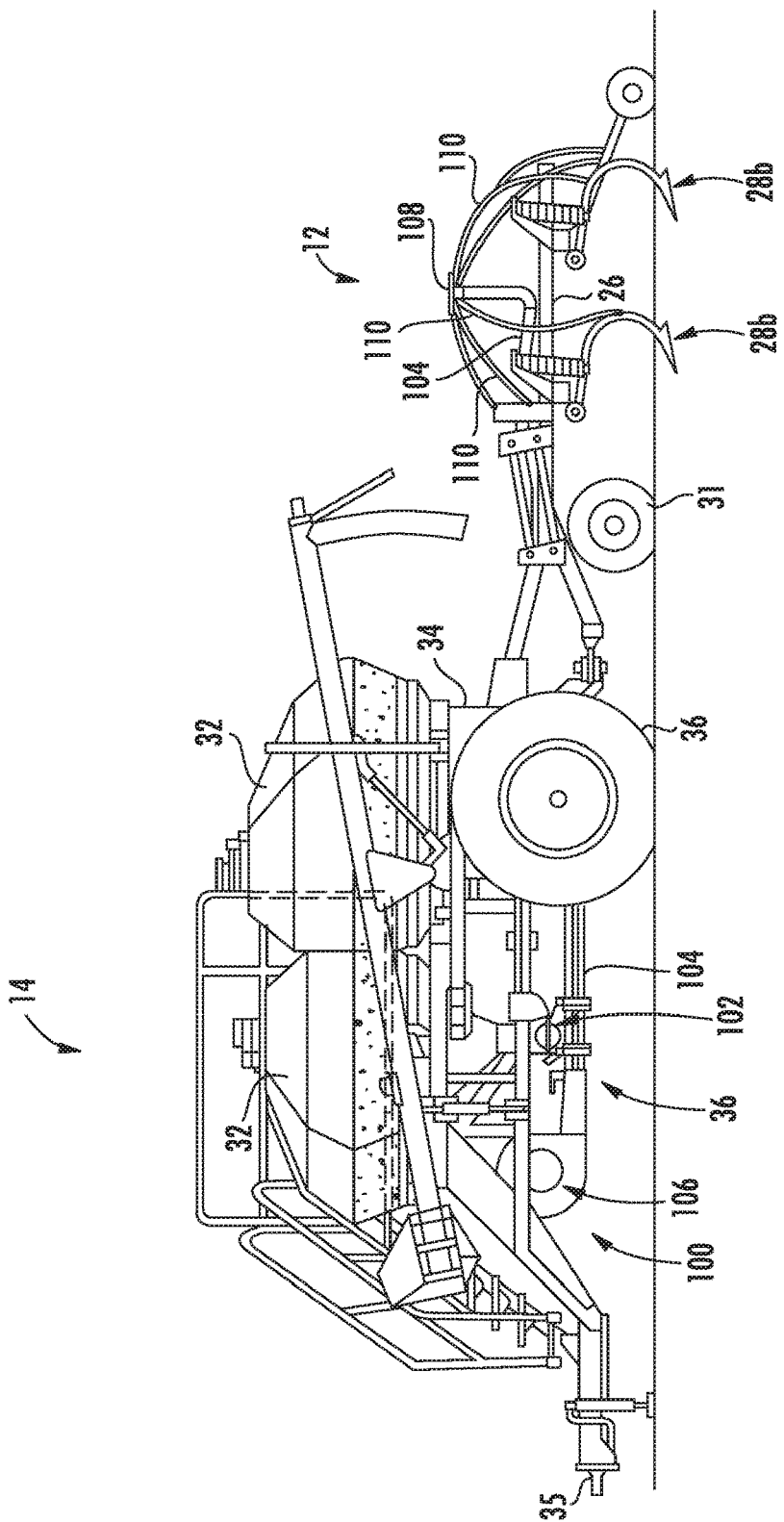
FIG. 2 illustrates a side view of one embodiment an implement and transport unit in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A crop production process in accordance with aspects of the present disclosure may include mixing an agricultural particulate with a flow of air. The air entrained flow of particles may flow through various distribution lines and/or manifolds before being inserted into the ground. An operator may set various operating parameters associated with the process, such as a desired particle flow rate and/or velocity. To minimize energy consumption and prevent damage to the particles, it is desirable to provide the minimum air flow rate and/or velocity necessary to achieve the desired particle flow rate and/or velocity. Plugging or slugging of the particles, which reduce the efficiency of the operation, may occur when the air flow rate and/or pressure becomes too low to keep the particles entrained within the air flow. Incipient plugging or slugging may cause a flow parameter associated with the flow of the air and/or particles to experience a plugging flow pattern. By detecting this plugging flow pattern, the disclosed system and method may detect incipient plugging or slugging and initiate a corrective action, such as alerting the operator or increasing the air flow rate, for example. The corrective action may reduce the likelihood that the distribution line experiences plugging.

Referring now to FIGS. 1 and 2, one embodiment of a work vehicle 10 towing an agricultural implement 12 and an associated transport unit 14 is illustrated in accordance with aspects of the present subject matter. Specifically, FIG. 1 illustrates a perspective view of the work vehicle 10, the implement 12, and the transport unit 14. Additionally, FIG. 2 illustrates an enlarged, partial side view of another embodiment of the implement 12 and the transport unit 14 that is shown in FIG. 1. It should be appreciated that, although the work vehicle 10 illustrated herein is configured as a tractor, the work vehicle 10 may generally be configured as any suitable work vehicle known in the art, such as any other agricultural vehicle, and/or the like. It should also be appreciated that, although the implement 12 illustrated herein corresponds to a planting implement or planter, the implement 12 may generally correspond to any suitable equipment or implement, such as a seeder, a fertilizer, a tillage implement, and/or the like. It should also be appreciated that, although the transport unit 14 illustrated herein corresponds to an air cart, the transport unit 14 may be any suitable device configured to transport agricultural particulate material.

As particularly shown in FIG. 1, the work vehicle 10 includes a pair of front wheels 16, a pair or rear wheels 18, and a chassis 20 coupled to and supported by the wheels 16, 18. An operator's cab 22 may be supported by a portion of the chassis 20 and may house various control devices (not shown) for permitting an operator to control the operation of the work vehicle 10. Additionally, the work vehicle 10 may include an engine (not shown) and a transmission (not shown) mounted on the chassis 20. The transmission may be operably coupled to the engine and may provide variably adjusted gear ratios for transferring engine power to the wheels 16, 18 via a differential (not shown).

The work vehicle 10 may be coupled to the implement 12 via a hitch assembly. It should be appreciated that the hitch assembly may correspond to a hitch of the work vehicle 10, a hitch of the implement 12, and/or a hitch of the air cart 14. For instance, referring to FIG. 2, in some embodiments, the air cart 14 may include a hitch 24 for coupling the air cart 14 to the work vehicle. Additionally, as shown in FIGS. 1 and 2, the implement 12 may be configured to be coupled to the air cart 14 and towed behind the air cart 14 during operation and transport. However, in other embodiments, the air cart 14 may be towed directly behind the work vehicle 10. For example, the air cart 14 may be coupled to the work vehicle 10 via the hitch assembly, with the implement 12 being towed behind the air cart 14. In another embodiment, the implement 12 and the air cart 14 may be part of a single unit that is towed behind the work vehicle 10, or elements of a self-propelled vehicle configured to distribute agricultural product across a field.

The implement 12 may include a tool frame 26 to which a set of ground engaging tools 28 may be coupled. By way of example, the ground engaging tools 28 may take the form of a plurality of disc-style opener units 28*a*, (illustrated in FIG. 1) or a plurality of tip-type opener units 28*b* (illustrated in FIG. 2). The ground engaging tools 28 may be configured to cut a furrow into the soil and deposit the product therein. Seed row finishing equipment, such as wheel packers or closing wheels 31, may be arranged on the implement 12, such as the embodiment shown in FIG. 2 for closing the furrow(s).

The air cart 14 may include a storage compartment 32 for storing an agricultural product(s) to be deposited within the field, a frame 34 for supporting the storage compartment 32, and wheels 36 coupled to the frame 34. In some embodiments, the storage compartment 32 may include multiple compartments for storing various flowable particulate materials or other granular agricultural products. For example, one compartment 32 may include seeds, and another compartment 32 may include a dry/granular fertilizer.

FIG. 3 schematically illustrates one embodiment of a product distribution system 100 in accordance with aspects of this disclosure. The product distribution system 100 may be configured to deliver an air entrained flow of product to the ground engaging tools 28. The product distribution system 100 may include a product metering system 102 configured to supply a controlled volume of product from the storage compartment(s) 32 into a mixing chamber 103 and through individual distribution lines 104 to the implement 12 such that the product can be variably distributed to the ground engaging tools 28 for insertion into the ground.

The product distribution system 100 may include one or more pressurized air sources 106 for generating an air flow directed through a corresponding primary distribution line 104. The pressurized air source 106 may include an air compressor, a fan, a combination thereof, and/or any suitable device for providing pressurized air. The product metering system 102 may supply the product to the primary distribution lines 104, and the product may become entrained in the air flow through the primary distribution lines 104 and carried by the air flow downstream. Each primary distribution line 104 may be connected to and in communication with a corresponding manifold 108 supported on the frame 26 of the implement 12. The product entrained in the air flow in the primary distribution line 104 may be supplied to the manifold 108 under pressure, and each manifold 108 may, in turn, supply the air entrained product to an associated set of ground engaging tools 28 for insertion into the ground. More specifically, each manifold 108 may be fluidly connected with a set of ground engaging tools 28 through secondary distribution lines 110.

Figure 4:
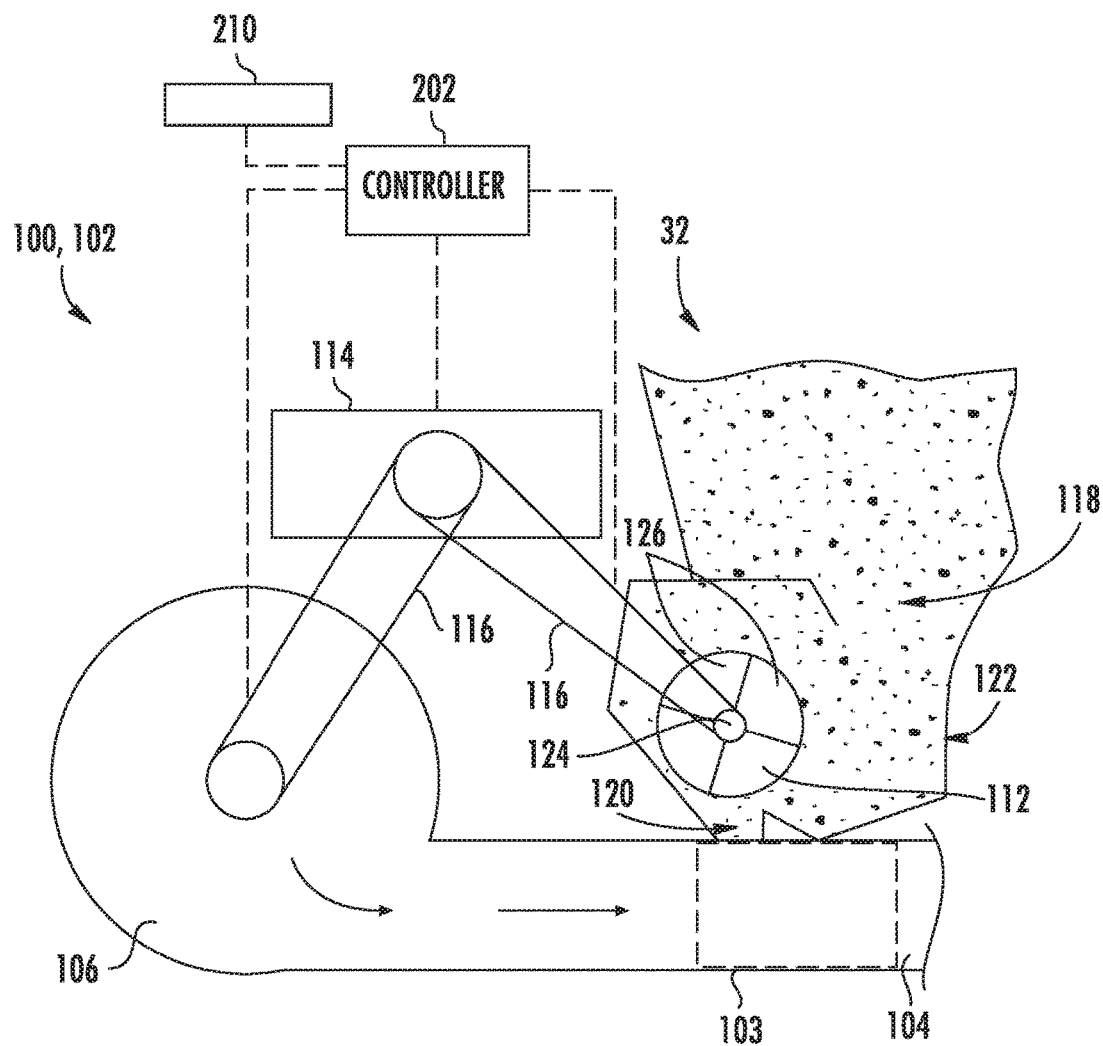
FIG. 4 illustrates a schematic view of one embodiment of a product metering system in accordance with aspects of the present subject matter.

FIG. 4 illustrates a portion of the product distribution system 100, including the product metering system 102. The product metering system 102 may include a meter wheel 112 for dispensing the product for delivery to the implement 12 through the primary product distribution lines 104. Any suitable metering mechanism may be used, however. The meter wheel 112 may be operatively connected to and driven by a motor 114 via one or more linkages 116, such as a transmission, a drive belt or the like. In some embodiments, the motor 114 may be a hydraulic motor, and in other embodiments may be an electric motor. In some embodiments, the motor 114 may also drive the pressurized air source 106. In other embodiments, separate motors may drive the pressurized air source 106. The metering system 102 and pressurized air source 106 may be driven by any suitable means, however.

The meter wheel 112 may be arranged between an intake 118 and an exit 120 of a metering chamber 122 and may be supported by a rotatable shaft 124 extending concentrically through the meter wheel 112. The meter wheel 112 may have a drum-like configuration and include multiple compartments 126 circumferentially spaced about the outer periphery thereof. The compartments 126 may be sized to convey and control the volume and rate of product transferred from the storage compartment 32, through the exit 120 of metering chamber 122, and into the mixing chamber 103. The product may mix with the flow of air supplied by the pressurized air source 106 in the mixing chamber 103 and the resulting air entrained product may flow through the primary distribution lines 104 to the implement 12. Any suitable metering mechanism, however, may be used to control the flow of the product from into the distribution lines 104.

Figure 5:
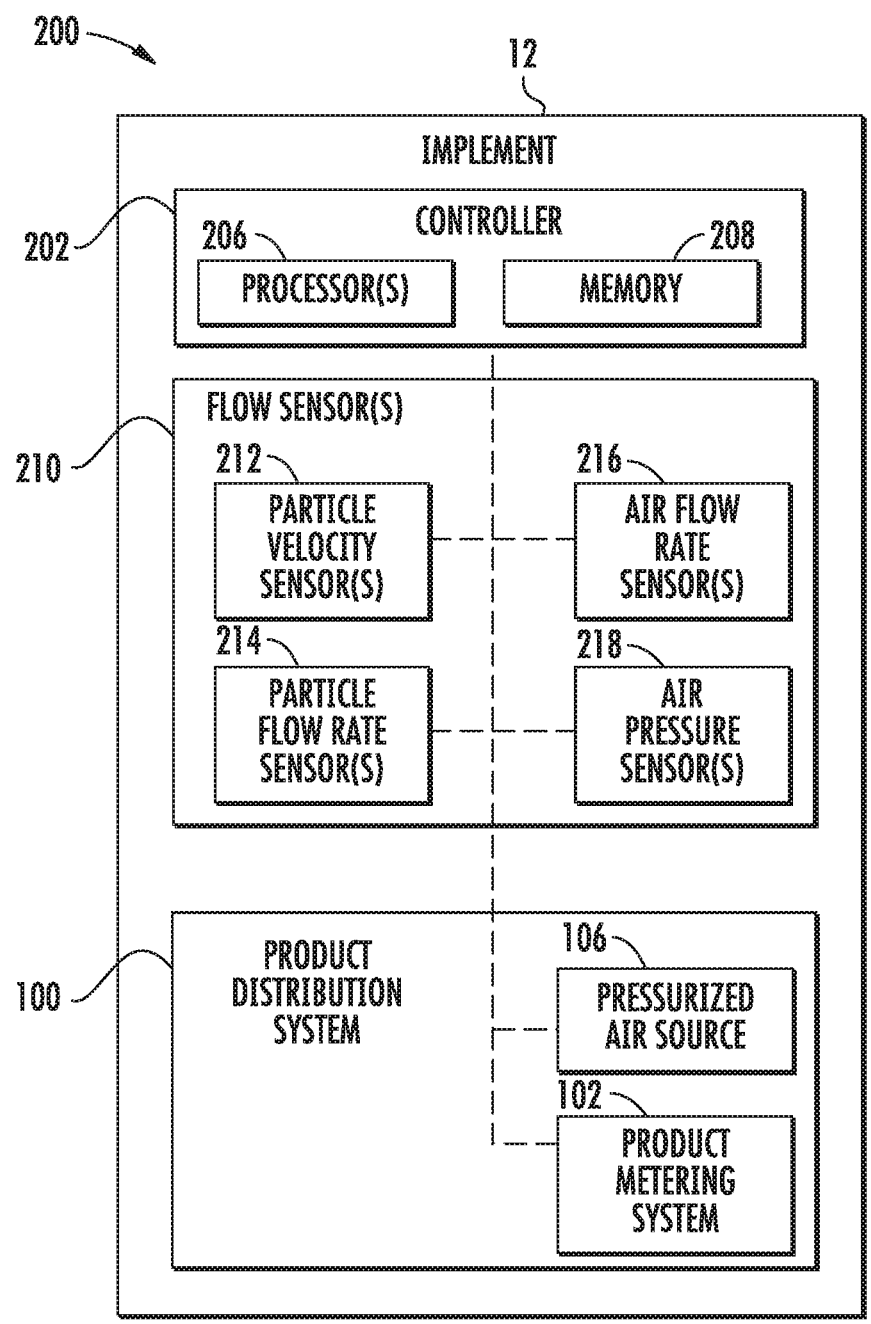
FIG. 5 illustrates a schematic view of one embodiment of a system for distributing an agricultural particulate material as part of a crop production process in accordance with aspects of the present subject matter.

Referring now to FIG. 5, a schematic view of one embodiment of a system 200 for distributing an agricultural particulate material as part of a crop production process is illustrated in accordance with aspects of the present subject matter. As shown, the system 200 may generally include a controller 202 installed on and/or otherwise provided in operative association with the implement 12. In general, the controller 202 may correspond to any suitable processor-based device(s), such as a computing device or any combination of computing devices. Thus, in several embodiments, the controller 202 may include one or more processor(s) 206 and associated memory device(s) 208 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206 configure the controller 202 to perform various computer-implemented functions, such as one or more aspects of the method 300 described below with reference to FIG. 6 and/or one or more aspects of the algorithm 500 described below with reference to FIG. 8.

The controller 202 may be communicatively coupled with one or more flow sensors 210. The flow sensor(s) 210 may be configured to measure at least one flow parameter associated with a flow of the product and/or air through the product distribution system 100. For example, in some embodiments the flow sensors 210 may include at least one of a particle velocity sensor 212, a particle flow rate sensor 214, an air flow rate sensor 216, or an air pressure sensor 218. Any suitable combination of the above flow sensors 210 may be used. In some embodiments, a single flow sensor may be selected from the sensors 210 listed above. In other embodiments, multiple flow sensors 210 of a single type may be used (e.g., two or more particle velocity sensors 212 disposed at different locations within the product distribution system 100). In other embodiments, multiple flow sensors 210 of different types may be used (e.g., one particle velocity sensor 212, one air flow rate sensor 216, and two air pressure sensors 218). In other embodiments, a single flow sensor 210 of any of the above types may be used.

The particle flow rate sensor 214 may have any suitable configuration. For example, in some embodiments, the particle flow rate sensor 214 may include a plate or diaphragm located within the product distribution system 100 such that a portion of the flow of particles impacts the diaphragm. The particle flow rate sensor 214 may be configured to measure the frequency of the impacts. For instance, the particle flow rate sensor 214 may include a microphone or pressure transducer configured to measure changes in pressure caused by the impacts. In other embodiments, the diaphragm may include a piezoelectric element configured to generate electrical signals in response to the impacts. In some embodiments, the particle flow rate sensor 214 may also be configured to measure the impact force associated with the impacts, which may then be used to additionally determine the velocity of the particles. For example, the amplitude of the measured acoustic or piezoelectric signals in the above described configurations may be indicative of the velocities of the particles. In other embodiments, the particle flow rate sensor 214 may be configured as an optical sensor. For instance, the particle flow rate sensor 214 may include an infrared (IR) beam emitter and sensor. The particle flow rate sensor 214 may be configured to sense the frequency at which the particles interrupt the IR beam.

The particle velocity sensor 212 may have any suitable configuration. In some embodiments, the particle velocity sensor 212 may be configured similar to the impact-type flow rate sensor 215 described above. For example, the particle velocity sensor 212 may include a diaphragm or piezoelectric element configured to measure the amplitude of particle impacts, and the measured amplitudes may be indicative of the particle velocity. In other embodiments, the particle velocity sensor 212 may be configured as an optical sensor. For instance, the particle velocity sensor 212 may include a pair of IR beam emitters and sensors. The pair of IR beam emitters and sensors may be spaced apart by a known distance. The time period between a given particle interrupting the first beam and interrupting the second beam may be calculated to determine the velocity of the particle.

The air flow rate sensors 216 and/or air pressure sensors 218 may have any suitable configuration. For example, in some embodiments, the air flow rate sensor 216 may be configured as a venturi or pitot tube. In some embodiments, the air pressure sensor 218 may include a pressure-sensitive member such as a diaphragm, piston, bellows, and/or the like and a transducer configured to measure the deflection of the pressure-sensitive member. The transducer may have any suitable configuration, such as a piezoelectric or capacitive transducer, for example.

Figure 3:
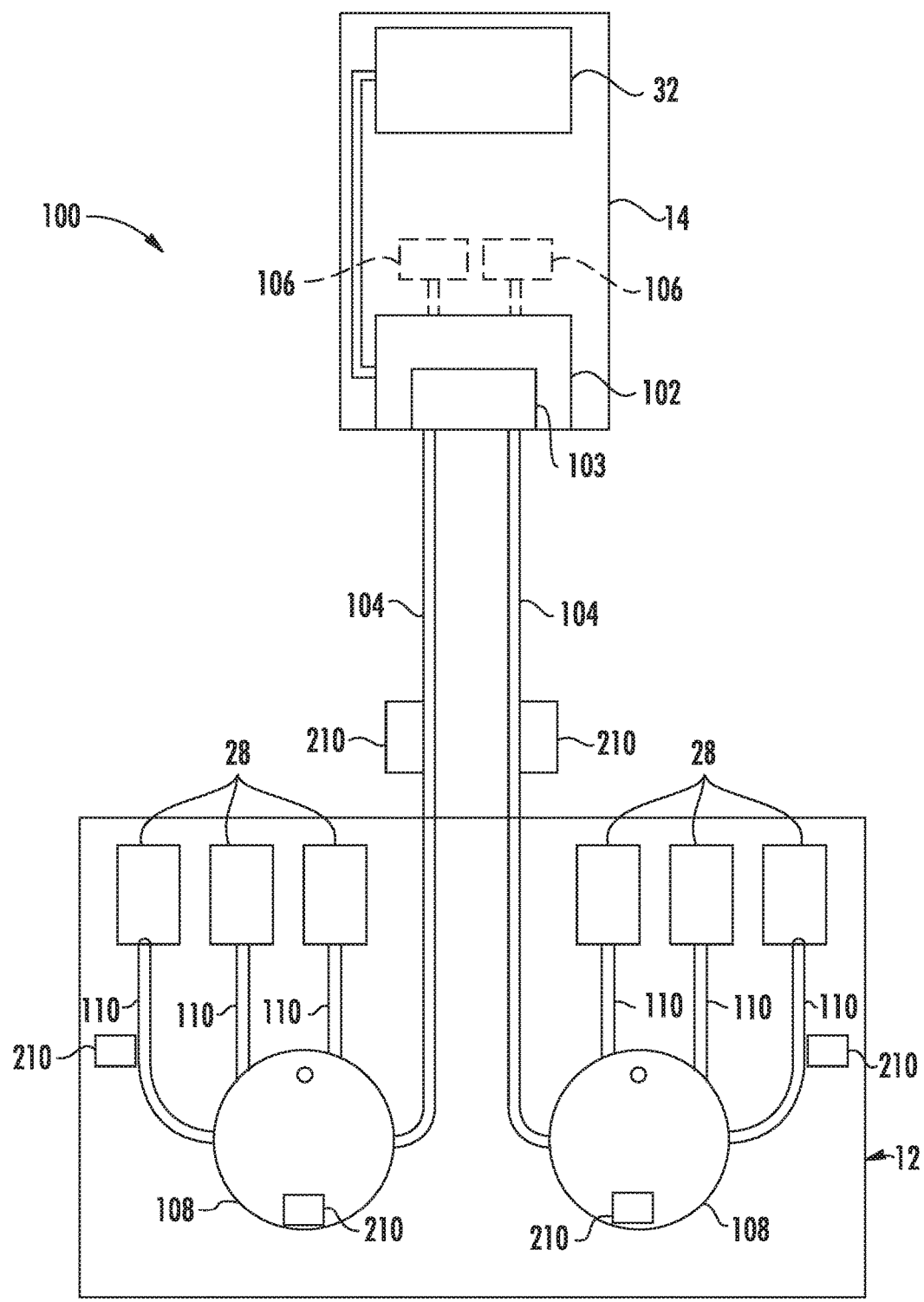
FIG. 3 illustrates a schematic view of one embodiment of a product distribution system in accordance with aspects of the present subject matter.

The flow sensor(s) 210 may be located at any suitable location(s) for measuring flow parameters. For example, referring back to FIG. 3, the flow sensor(s) 210 may be associated with the primary distribution lines 104, the secondary distribution lines 110, the manifolds 108, and/or the any other suitable location for measuring flow parameters. Although multiple flow sensor(s) 210 are illustrated in FIG. 3, it should be understood that, in some embodiments, a single flow sensor 210 may be used.

The controller 202 may also be communicatively coupled with the product distribution system 100 and configured to monitor and/or control the operation of product distribution system 100. For example, the controller 202 may be communicatively coupled with the motor 114 of the metering system 102 such that the controller 202 may control the amount of product delivered to the implement 12 through the one or more distribution lines 104. For example, the controller 202 may selectively vary the speed of rotation of the corresponding meter wheel 112. By varying the speed of rotation of the meter wheel 112, the speed of rotation of the compartments 126 may be adjusted to increase or decrease the amount of product supplied to a corresponding distribution line 104. In some embodiments, the product metering system 102 may include multiple metering chambers 122, and each metering chamber 122 may have a respective motor 114. This configuration may be used to distribute product at different rates to the various distribution lines 104. The respective motors 114 and/or linkage 116 may be individually controlled by the controller 202 such that each respective meter wheel 112 may be operated at a different speed, if so desired. Thus, in some embodiments, the controller 202 may be configured to selectively control the rate of the product supplied to each distribution line 104.

Figure 6:
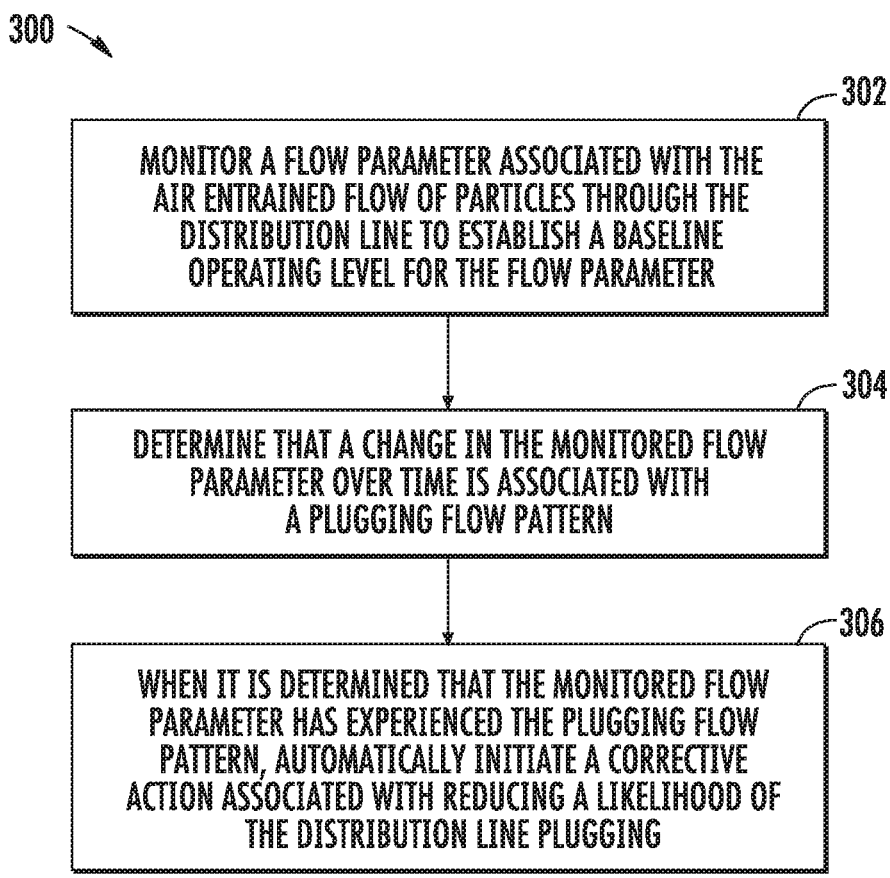
FIG. 6 illustrates a flow diagram of one embodiment of a method for distributing an agricultural particulate material as part of a crop production process in accordance with aspects of the present subject matter.

FIG. 6 illustrates one embodiment of a method 300 for distributing an agricultural particulate material as part of a crop production process using an agricultural implement 12 in accordance with aspects of the present subject matter. Although FIG. 6 depicts steps performed in a particular order for purposes of illustration and discussion, the method 300 is not limited to any particular order or arrangement. One skilled in the art, using the disclosures provided herein, will appreciate that various steps of the method 300 can be omitted, rearranged, combined, and/or adapted in various ways without deviating from the scope of the present disclosure.

The method 300 may include, at (302), monitoring a flow parameter associated with the air entrained flow of particles through the distribution line to establish a baseline operating level for the flow parameter. Examples of the flow parameters may include air flow rate, air pressure, particle flow rate, particle velocity, and/or the like. For example, in some embodiments, the controller 202 may be configured to monitor an air pressure and/or an air flow rate within at least one distribution line 104, 110 using the air pressure sensor(s) 218 and/or flow rate sensor(s) 216. In some embodiments, the controller 202 may be configured to monitor the particle flow rate and/or the particle velocity through at least one distribution line 104, 110 using the particle flow rate sensor(s) 212 and/or the particle velocity sensor(s) 214.

Additionally, the method may include, at (304), determining that a change in the monitored flow parameter over time is associated with a plugging flow pattern that is indicative of potential plugging of the distribution line 104, 110. Embodiments of the plugging flow pattern are discussed in greater below. As indicated above, in some embodiments, the controller 202 may be configured to monitor multiple flow parameters based on the respective signals received from multiple flow parameter sensors 210. In some embodiments, the controller 202 may be configured to determine when any one of the monitored flow parameter experiences a change over time associated with the plugging flow pattern. In other embodiments, the controller 202 may be configured to calculate the flow parameter based on a combination of signals received from multiple flow parameter sensors 210. For instance, in one embodiment, the flow parameter may be calculated as an average of air pressures measured at different locations within the distribution lines 104, 110. In other embodiments, the flow parameter may be calculated as the difference between various measurements (e.g., two air pressure measurements at different locations within a single distribution line 104, 110). In some embodiments, the flow parameter may be a mathematical combination of different types of monitored signals. For example, in one embodiment, the flow parameter may be a mathematical combination of the monitored air flow rate and the monitored particle flow rate.

Moreover, as shown in FIG. 6, the method may include, at (306), automatically initiating, with the one or more computing devices, a corrective action associated with reducing a likelihood of the distribution line(s) 104, 110 plugging when it is determined that the monitored flow parameter has experienced the plugging flow pattern. In some embodiments, the corrective action may include increasing an air flow rate through the distribution line(s) 104, 110. In some embodiments, the corrective action may include providing an alert for an operator of the agricultural implement 12. In other embodiments, the corrective action may include reducing the rate at which the product mixed into the flow of air. For example, the corrective action may include reducing the speed of the meter wheel 112 to reduce the flow rate of particles into the mixing chamber 103 and ultimately into the distribution line(s) 104, 110.

Figure 7A:
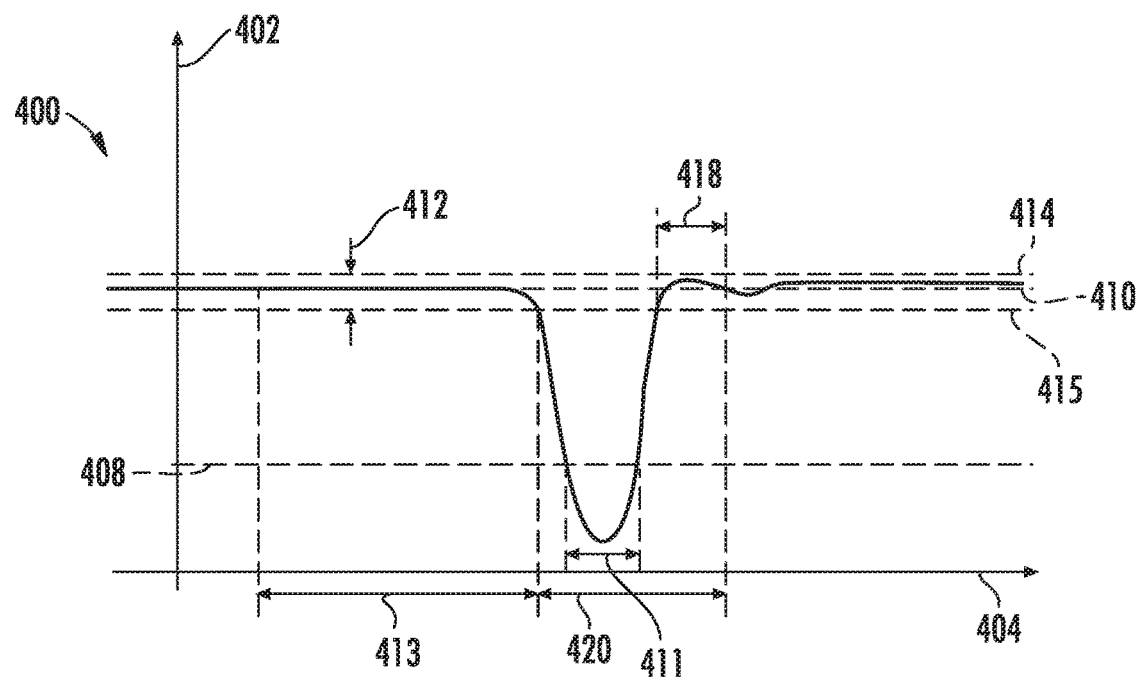
FIGS. 7a and 7b illustrate respective embodiments of a plugging flow pattern in accordance with aspects of the present subject matter.

FIG. 7*a* illustrates a graphical view of one example plugging flow pattern 400 in accordance with aspects the present subject matter. As described above, when the flow parameter experiences a change over time associated with the plugging flow pattern, it may indicate that the air entrained particulate material or product will soon experience slugging or plugging. In some embodiments, the plugging flow pattern may include a reduction in the flow parameter below a first predetermined flow value 408 defined relative to a baseline operating level 410 across a first predetermined time interval 411 followed by an increase in the flow parameter to within a predetermined threshold range 412 defined relative to the baseline operating level 410.

In some embodiments, the baseline operating level 410 may be a flow parameter value that is indicative of normal, steady state operation without plugging or slugging of the air entrained particles. For example, in some embodiments, the controller 202 may be configured to determine the baseline operating level 410 based on an average monitored flow parameter value during a predetermined initial time interval 413 preceding the flow parameter experiencing the plugging flow pattern. For example, the controller 202 may be configured to calculate a moving average of the monitored flow parameter over the predetermined initial time interval 413.

In some embodiments, the predetermined threshold range 412 may define an upper bound 414 and a lower bound 415 around the baseline operating level 410. For example, a middle of the predetermined threshold range 412 may correspond to the baseline operating level 410. The predetermined threshold range 412 (and the associated upper and lower bounds 414, 415) may be selected based on normal, steady state operating conditions. For example, in some embodiments, the predetermined threshold range 412 may be representative of normal variation in the flow parameter from the baseline operating level 410 during normal operation when no incipient slugging or plugging is occurring. The predetermined initial time interval 413 may be selected based on similar considerations. Additionally, in some embodiments, the predetermined initial time interval 413 may be selected based on how quickly the flow parameter may be intentionally changed by an operator-initiated action. For example, if the operator instructs the controller 202 to increase the particle flow rate, the controller 202 may be configured to do so at a relatively slow rate to prevent plugging or slugging. The predetermined initial time interval 413 may be short enough that the baseline operating level 410 adjusts in response to an operator-initiated action in a timely manner. The predetermined initial time interval 413 may be long enough, however, that the baseline operating level 410 does not significantly change during a rapid decrease and increase in the flow parameter associated with plugging or slugging.

In some embodiments, the plugging flow pattern may include a predetermined settling time interval 418. The predetermined settling time interval 418 may be selected based on the stability of the product distribution system 100 following a rapid reduction in the flow parameter. Following a reduction to below first predetermined flow value 408, the flow parameter may remain within the predetermined threshold range 412 defined relative to the baseline operating level 410 for the predetermined settling time interval 418. In some embodiments, this may indicate that the product distribution system 100 has recovered and resumed steady state operation. For example, this may indicate the end of the plugging flow pattern.

In some embodiments, the plugging flow pattern may include a total time interval 420. For example, in some embodiments, the total time interval 420 may be defined from when the flow parameter first falls below the lower bound 415 to when the flow parameter has remained within the predetermined threshold range 412 defined relative to the baseline operating level 410 for the predetermined settling time interval 418. In other embodiments, the total time interval 420 may be from when the flow parameter first reduces below the lower bound 415 to when the flow parameter increases above the lower bound 415 (illustrated as the start of the predetermined settling time interval 418 in FIG. 7a.)

Figure 7B:
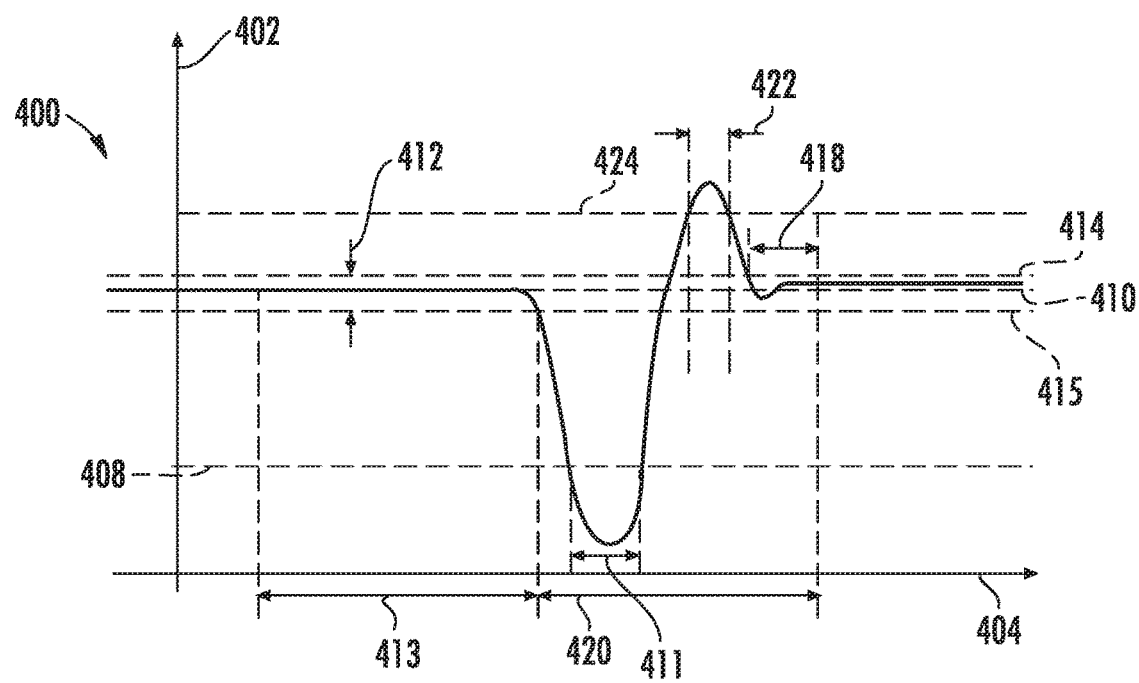

Referring to FIG. 7b, in some embodiments, the flow parameter 402 may briefly surge above the predetermined threshold range 412 defined relative to the baseline operating level 410. Such a surge following a rapid drop in the flow parameter may also indicate incipient plugging. For example, in some embodiments, the plugging flow pattern may include a second predetermined time interval 422 and a second predetermined flow value 424. In some embodiments, the flow parameter 402 may exceed the second predetermined flow value 424 for the second predetermined time interval 422. In some embodiments, the second predetermined flow value 424 may be equal to the upper bound 414.

Figure 8:
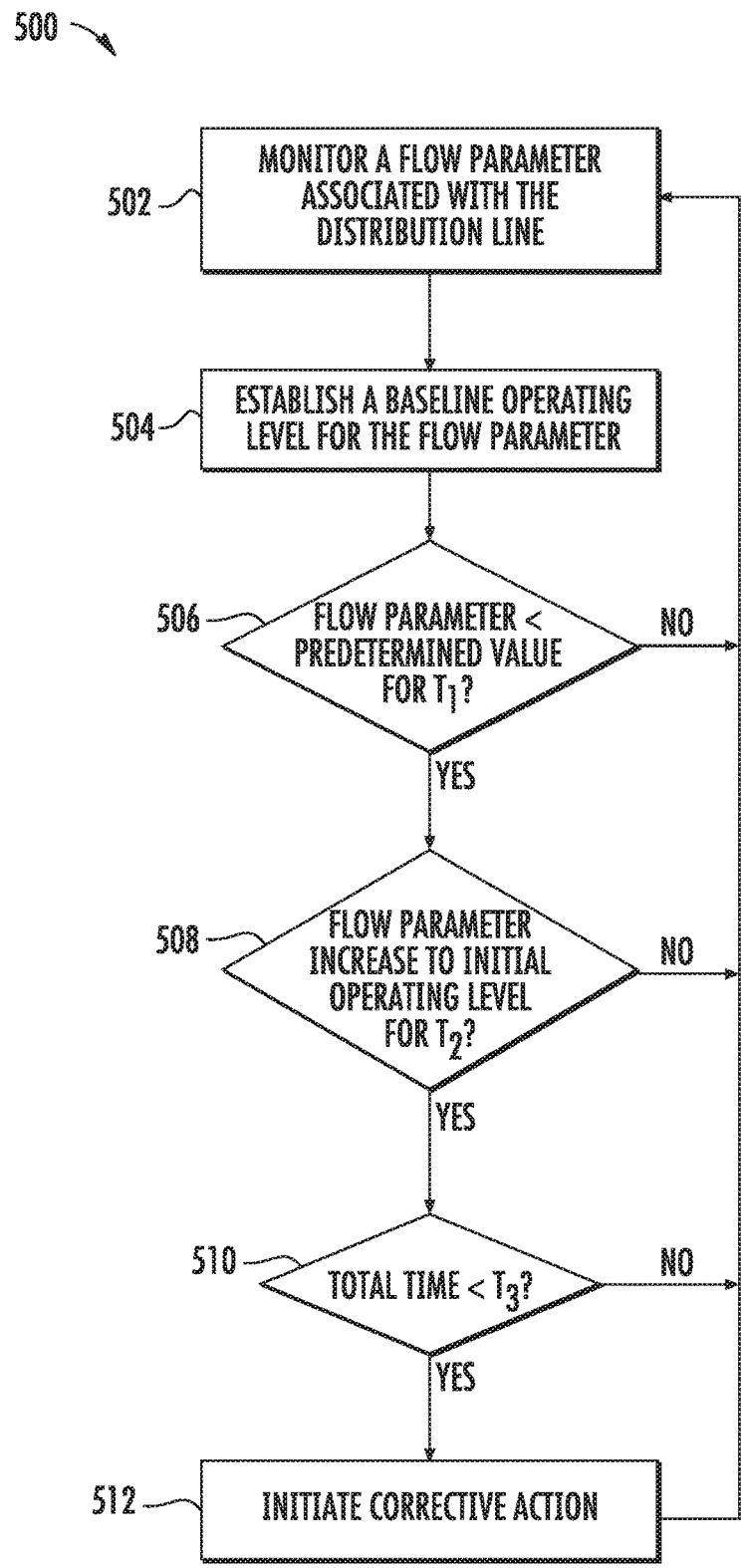
FIG. 8 illustrates a flow diagram of an algorithm representing a specific implementation of the method shown in FIG. 6 in accordance with aspects of the present subject matter.

FIG. 8 illustrates a flow diagram of a specific algorithm 500 that may be used when implementing one embodiment of the method 300 described above with reference to FIG. 6. Although FIG. 8 depicts steps performed in a particular order for purposes of illustration and discussion, the algorithm 500 is not limited to any particular order or arrangement. One skilled in the art, using the disclosures provided herein, will appreciate that various steps of the algorithm 500 can be omitted, rearranged, combined, and/or adapted in various ways without deviating from the scope of the present disclosure.

The algorithm 500 may include, at (502), monitoring a flow parameter associated with the air entrained flow of particles. For example, the controller 202 may be configured to monitor a flow parameter based on signals receive from the flow sensor(s) 210, as explained above. As indicated above, examples of the flow parameter may include the particle velocity, particle flow rate, air flow rate, and/or air pressure.

The algorithm 500 may include, at (504), establishing a baseline operating level 410 for the flow parameter. For example, as indicated above, the controller 202 may be configured to calculate a moving average of the monitored flow parameter over the predetermined initial time interval 413. In some embodiments, the baseline operating level 410 for the flow parameter may additionally be based on an operator input. For instance, in one embodiment, the baseline operating level 410 may be based on one or more operator-set flow parameters, such as a target particle flow rate and/or a target air flow rate.

The algorithm 500 may include, at (506), determining when the flow parameter has reduced below a first predetermined flow value 408 defined relative to the baseline operating level for a first predetermined time period $T_1$ (e.g., time period 411 shown in FIGS. 7a and 7b). In some embodiments, the first predetermined flow value 408 may be selected based on the amount of reduction in the flow parameter that the product distribution system 100 may be able to undergo and still automatically recover. As indicated above, this rapid reduction and recovery may occur when the product distribution system is likely to begin plugging or slugging. During plugging or slugging, the product distribution system 100 may experience larger reductions in the flow parameter and be unable to automatically recover.

If the flow parameter satisfies the above condition at (506), the algorithm 500 may include, at (508), determining when the flow parameter has increased to within a predetermined threshold range 412 defined relative to the baseline operating level, such as within the upper and lower bounds 414, 415 shown in FIGS. 7a and 7b.

If the flow parameter satisfies the above-described condition at (508), the algorithm may include at (510), determining if a total time interval associated with the flow parameter is less than the predetermined total time interval 420, $T_3$. For example, in some embodiments, the total time interval may be measured from when the flow parameter reduces below the predetermined threshold range 412 defined relative to the baseline operating level to when the flow parameter increases to within the predetermined threshold range 412 defined relative to the baseline operating level.

In other embodiments, the total time interval may include the predetermined settling time interval 418, as described above.

The predetermined total time interval 420 may be selected based on the speed at which the plugging flow pattern is most indicative of incipient plugging or slugging. For example, a rapid fluctuation in the flow parameter associated with the plugging flow pattern may be more indicative of incipient plugging or slugging than a slow fluctuation in the flow parameter. In some embodiments, the predetermined total time interval 420 may be relatively short. For example, in some embodiments, the predetermined total time interval 420 may be two second or less, and in some embodiments, one second or less, and in some embodiments 0.5 seconds or less.

If any of the conditions at (506), (508), or (510), are not met, the algorithm may include returning to (502). If the total time is less than the predetermined total time interval 420, $T_3$, the algorithm 500 may include, at (512), initiating a corrective action. As indicated above, the corrective action may include increasing an air flow rate through the distribution line, providing an alert for an operator of the agricultural implement, reducing the rate at which the product mixed into the flow of air, and/or the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for distributing an agricultural particulate material as part of a crop production process, the system comprising:
    a distribution line configured to receive an air entrained flow of particles;
    a flow sensor configured to measure a flow parameter associated with the air entrained flow of particles through the distribution line; and
    a controller communicatively coupled with the flow sensor, the controller including a processor and associated memory, the memory storing instructions that, when executed by the processor, configure the controller to:
        monitor a flow parameter associated with the air entrained flow of particles through the distribution line to establish a baseline operating level for the flow parameter;
        determine that a change in the monitored flow parameter over time is associated with a plugging flow pattern that is indicative of potential plugging of the distribution line, the plugging flow pattern being represented by a reduction in the flow parameter below a first predetermined flow value defined relative to the baseline operating level across a first predetermined time interval followed by an increase in the flow parameter to within a predetermined threshold range defined relative to the baseline operating level; and
        when it is determined that the monitored flow parameter has experienced the plugging flow pattern, automatically initiate a corrective action associated with reducing a likelihood of the distribution line plugging.

2. The system of claim 1, wherein the flow parameter is indicative of an air flow rate of the air flow through the distribution line.

3. The system of claim 1, wherein the flow parameter is indicative of an air pressure within the distribution line.

4. The system of claim 1, wherein the flow parameter is indicative of a particle flow rate of the particles through the distribution line.

5. The system of claim 1, wherein the flow parameter is indicative of an average particle velocity of the particles through the distribution line.

6. The system of claim 1, wherein the controller is further configured to determine the baseline operating level based on an average of the monitored flow parameter values during a predetermined initial time interval preceding the flow parameter experiencing the plugging flow pattern.

7. The system of claim 1, wherein the plugging flow pattern is representative of a pattern of the monitored flow parameter across a predetermined total time interval, the predetermined total time interval being less than two seconds.

8. The system of claim 1, wherein the plugging flow pattern includes a predetermined settling time interval in which the flow parameter remains within the predetermined threshold range defined relative to the baseline operating level.

9. The system of claim 1, wherein the corrective action includes increasing an air flow rate of the air flow through the distribution line.

10. The system of claim 1, wherein the corrective action includes providing an alert for an operator of the agricultural implement.

11. A method for distributing an agricultural particulate material as part of a crop production process using a distribution line configured to receive an air entrained flow of particles, the method comprising:
    monitoring, with one or more computing devices, a flow parameter associated with the air entrained flow of particles through the distribution line to establish a baseline operating level for the flow parameter;
    determining, with the one or more computing devices, that a change in the monitored flow parameter over time is associated with a plugging flow pattern that is indicative of potential plugging of the distribution line, the plugging flow pattern being represented by a reduction in the flow parameter below a first predetermined flow value defined relative to the baseline operating level across a first predetermined time interval followed by an increase in the flow parameter to within a predetermined threshold range defined relative to the baseline operating level; and
    when it is determined that the monitored flow parameter has experienced the plugging flow pattern, automatically initiating, with the one or more computing devices, a corrective action associated with reducing a likelihood of the distribution line plugging.

12. The method of claim 11, wherein monitoring the flow parameter includes monitoring an air flow rate of the air flow through the distribution line.

13. The method of claim 11, wherein monitoring the flow parameter includes monitoring an air pressure within the distribution line.

14. The method of claim 11, wherein monitoring the flow parameter includes monitoring a particle flow rate of the particles through the distribution line.

15. The method of claim 11, wherein monitoring the flow parameter includes monitoring a particle velocity of the particles through the distribution line.

16. The method of claim 11, further comprising determining the baseline operating level based on an average monitored flow parameter value during a predetermined initial time interval preceding the flow parameter experiencing the plugging flow pattern.

17. The method of claim 11, wherein the plugging flow pattern includes a predetermined settling time interval in which the flow parameter remains within the predetermined threshold range defined relative to the baseline operating level.

18. The method of claim 11, wherein the plugging flow pattern is representative of a pattern of the monitored flow parameter across a predetermined total time interval, the predetermined total time interval being less than two seconds.

19. The method of claim 11, wherein automatically initiating the corrective action includes increasing an air flow rate through the distribution line.

20. The method of claim 11, wherein automatically initiating the corrective action includes providing an alert for an operator of the agricultural implement.

* * * * *